United States Patent Office 3,471,999
Patented Oct. 14, 1969

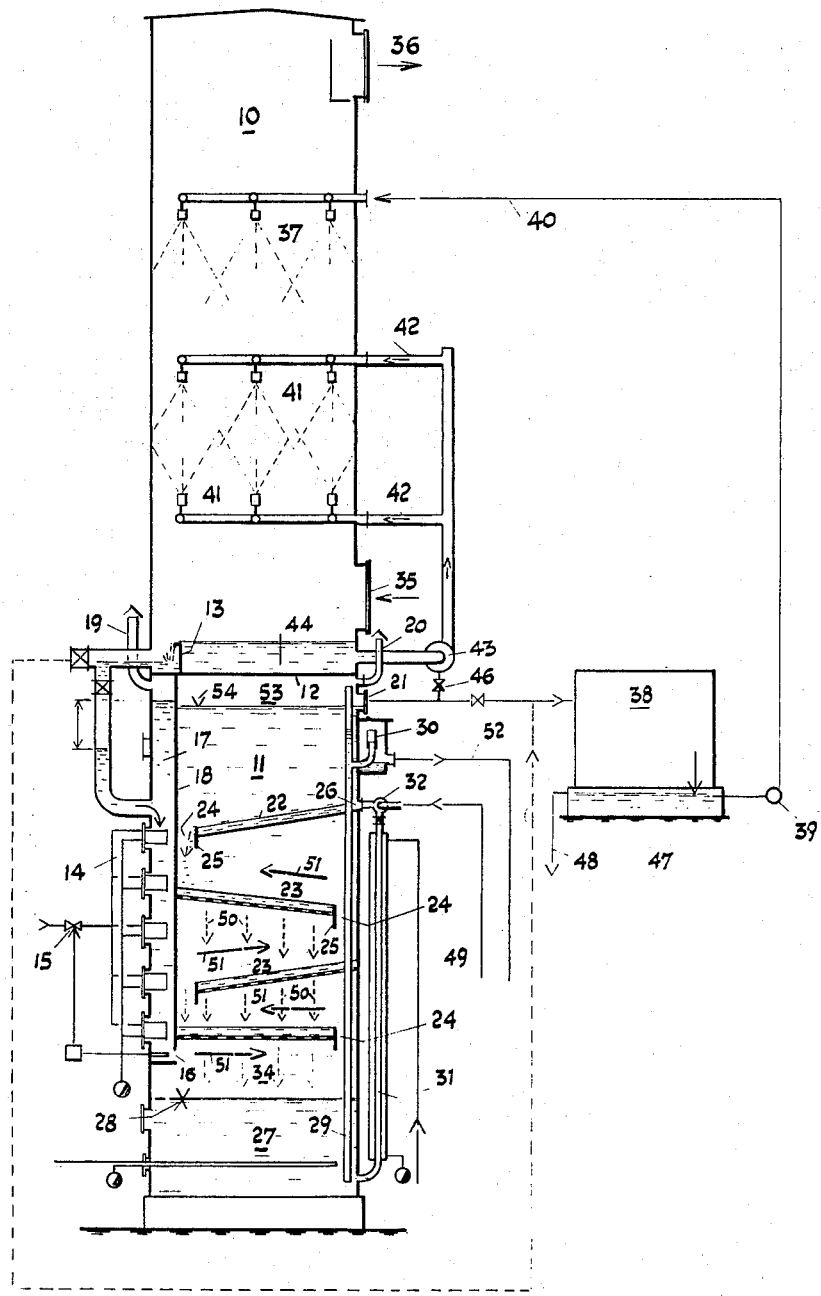

3,471,999
PROCESS AND DEVICE FOR THE SEPARATION OF NAPHTHALENE FROM COKE OVEN GAS
Erich F. Schön, Bochum, Germany, assignor to C. Otto & Comp. G.m.b.H., Bochum, Germany
Filed Nov. 13, 1967, Ser. No. 682,159
Int. Cl. B01d 47/02
U.S. Cl. 55—85                                      15 Claims

ABSTRACT OF THE DISCLOSURE

A process and device for the separation of naphthalene from coke oven gas in high yield. The gas is washed with slightly heated water in the upper zone of a tower, the enriched water collected and moved to the bottom of a lower zone of the tower. An organic solvent of higher density than water is forcibly injected into the upper part of said lower zone and contacts the enriched water in countercurrent flow, forcing it in upward direction. For improved contact, baffle plates are provided. The solvent, now enriched with naphthalene is recovered and/or recirculated, and the naphthalene ultimately separated therefrom.

---

In the so-called direct ammonia production from coke oven distillation gas, ammonia is separated with an acid, usually sulfuric acid, by conducting the gas therethrough or by spraying the acid into the gas; and the ammonia separation is followed by terminal cooling of the gas to approximately ambient (room) temperatures. The direct wash of the gas with cold water not only lowers the gas temperature but also effects separation of considerable quantities of naphthalene therefrom in crystalline or flocculent form. To enable prolonged use of the cooling water, the presence of larger amounts of naphthalene is to be avoided in order to prevent clogging of the device used and its conduits.

The theoretically simplest means of naphthalene separation is its mechanical removal. However, the separation is incomplete. Such mechanical separation can be carried out by means of scrapers, skimmers, by filtration, sedimentation, or by removal of a naphthalene-containing foam generated on the water surface.

It has been attempted to wash the water, prior to its recirculation, with tars or tar oils, and also with mineral oil. However, the concentration of naphthalene in these agents had been too low for economical production.

It is an object of the invention to increase the naphthalene concentration in suitable naphthalene solvents with which the circulated wash water is treated.

It is another object of the invention to devise an apparatus for the treatment of water and naphthalene solvent in such a manner that the largest possible contact areas for these two liquid media are present.

A further object of the invention is an extensive separation of the naphthalene solvent after a single contact with the heated wash water, thus enabling recirculation of the solvent in the device.

Still another object is a compact construction of the device by arranging the means for heating of the water and for the naphthalene separation closely together to fit in the structure of the terminal cooling device.

According to the invention, the naphthalene-containing water, obtained from the direct wash of coke oven gas with circulated water and its treatment with a naphthalene solvent, is heated at least slightly prior to cooling and recirculation into the washer and is contacted countercurrently with the solvent, whereby the latter becomes enriched with naphthalene. The material exchange between water and solvent is favored by higher temperatures so that more naphthalene is washed out at elevated temperatures.

The device for the treatment of the naphthalene-containing water with solvent is a tower which is provided with baffle plates which are horizontal or slightly inclined downwardly, relative to the tower axis. These plates have overflow weirs at mutually opposite ends. The napthalene solvent is introduced onto the topmost of these baffle plates, and the water is entered through the lower part of the tower. At least some of the baffle plates may have perforated bottoms which promote a spray-type throughflow of the solvent which has higher specific gravity than the water. The weirs have extensions which go below the bottoms of the plates in order to prevent interference by the upward-flowing water below the plates.

A substantially vertical wall may provide a heating shaft in the tower into which the water is introduced from the top and conducted to the bottom part of the treating zone where it contacts the naphthalene solvent.

Of great importance are means which a sump filled with solvent at the bottom of the tower. Solvent for the circulation is taken from this sump. An exactly defined interface between the solvent (bottom layer) and the supernatant water is assured by an adjustable overflow of a pipe which is immersed in the sump and serves for withdrawal of the naphthalene-enriched solvent.

The compact construction is attained by the tower-like structure wherein the water is treated with the naphthalene solvent. Its sump is high enough to provide a head for the overflowing water into the heating shaft, mentioned above, or into the cooling tower for the water.

The invention now will be more fully explained with reference to the accompanying drawing. However, it should be understood that this is given merely by way of illustration, and not of limitation, and that it is intended to cover all modifications and variations of the invention which do not constitute a departure from the spirit and the scope thereof as hereinafter claimed.

The drawing is a schematic of an elevation of the tower, consisting of a washer forming the terminal cooling device, and a container for the treatment of the wash water with the naphthalene solvent.

Referring now to this drawing, both aggregates, the gas washer 10 and the treater for the water with the solvent, 11, are of cylindrical shape of approximately like diameter. The two are separated from each other in a gastight manner by a partition 12.

The coke oven gas enters washer 10 at inlet 35 at a temperature of substantially 35–40° C. and leaves through outlet 36 and has, at this time, a temperature of approximately 20–25° C. Spray nozzles 37 distribute cooling water coming from the bottom container 47 of cooling tower 38 by way of conduit 40, pumped by pump 39. The wash water, introduced through conduits 42 and delivered by pump 43 from sump 44 of washer 10, has a temperature of approximately 33–38° C. and is distributed by spray nozzles 41. Depending upon the position of valve 46, more or less water is conducted directly from sump 44 into cooling tower 38, so that the appropriate and efficient amount of wash water is available for the naphthalene wash. Tower 38 is provided with an outlet 48.

The lower part of the tower is divided by a wall 18 into the treatment zone 11 for the material exchange between wash water and naphthalene solvent and into a vertical shaft 17. The lower outlet 16 of the latter empties into the space 34 of treater 11 which is filled primarily with water and is disposed above the sump 27, filled with solvent. The water is heated in shaft 17 so that its temperature in space 34 is approximately 43–48° C. The interface of water and naphthalene solvent is shown as 28. The solvents used are bituminous coal tar fractions, i.e., anthracene oil or the fraction known in the art as "wash oil."

Water which is not circulated from sump 44 to cooling tower 38 nor conducted back to nozzles 41 by pump 43, flows over the overflow 13 into a pipe (not shown) and is conducted to shaft 17. Heaters 14 are disposed therein which are heated with steam the amount of which is controlled by valve 15.

The treater 11 is provided with baffle plates 22, 23 which are shown in downwardly inclined position, with the exception of the lowest one. These plates have overflow weirs 25 at their ends which protrude downwardly. The position of weirs 25 together with the opposite tower wall provide openings 24. The intermediate baffle plates 23 have perforated bottoms. Fresh solvent having a temperature of substantially 25–35° C. is conducted, by means of injector 32, from conduit 49 into treater 11 through inlet 26. It slowly moves downwardly on the topmost baffle plate 22, flows over the weir 25 of that plate and onto the next baffle plate 23. Since the latter is provided with perforations, only a part of the solvent reaches its weir 25 while the other part sinks downwardly through the perforation in the form of a spray, as shown by the broken line arrows 50. The naphthalene-containing water from space 34 flows in substantially horizontal direction, as shown by solid arrows 51, between the baffle plates and enters the next higher material exchange space.

In order to maintain constant conditions in treater 11, particularly to keep the interface 28 at constant level, a pipe 29 empties into sump 27, provided with an adjustable overflow 30. The naphthalene solvent which overflows through 30 is withdrawn through conduit 52. By adjusting the overflow 30, constant level of the solvent is maintained. The intensive contact of the rising water with the sinking naphthalene solvent effects extraction of the naphthalene from the water. In order to increase this effect even more, a portion of the solvent is conducted from sump 27 to pipe 31. The latter empties into injector 32 so that liquid is entrained in the solvent freshly introduced through conduit 49 and enters into treater 11 at inlet 26.

Shaft 17 is provided with separate ventilation means 19, and space 53 above the water level 54 has separate ventilation means 20. The water flows off from level 54 and into cooling tower 38.

The naphthalene then is recovered from its solution in the conventional manner, i.e., by distillation or crystallization.

I claim as my invention:

1. A process for the separation of naphthalene from coke oven gas which process comprises the steps of washing said gas with water in a first operational zone to extract therefrom a part of said naphthalene, said gas, upon entering said first zone, being at a temperature below 40° C., said water being at a temperature of at least 33° C.; heating said water containing said extracted naphthalene to a temperature of at least 43° C.; contacting in a second operational zone, said heated water containing said extracted naphthalene with a solvent for said naphthalene.

2. A process as in claim 1 wherein said gas upon entering said first zone is at a temperature of substantially 35–40° C., and upon exiting therefrom is at a temperature of 20–25° C.; said water is at a temperature of substantially 33–38° C.; said water containing said extracted naphthalene is heated to a temperature of substantially 43–48° C. and said solvent is at a temperature of substantially 25–35° C.

3. The process as defined in claim 2 wherein said heated water containing said extracted naphthalene and said solvent are contacted with one another in countercurrent flow.

4. The process as defined in claim 3 wherein said solvent has a higher specific gravity than water, said contacted heated water containing said extracted naphthalene and said solvent are collected in a vessel and form therein an interface with each other, and said interface is kept at a constant level.

5. The process as defined in claim 2, wherein said solvent is a bituminous coal tar fraction.

6. The process as defined in claim 5, wherein said fraction is selected from the group consisting of anthracene oil and wash oil.

7. A process for the separation of naphthalene from coke oven gas which comprises washing said gas at a temperature of substantially 35–40° C. with an effective amount of water having a temperature of substantially 33–38° C. in a first operational zone; transferring said water with entrained naphthalene into a second operational zone; moving water plus naphthalene in an upward direction from a sump while at a temperature of substantially 43–48° C. and contacting it with a solvent selected from the group consisting of anthracene oil and wash oil having a temperature of substantially 25–35° C. in countercurrent flow; said solvent and water forming an interface on said sump, said interface being kept at a constant level; and withdrawing said solvent now laden with naphthalene from said second zone.

8. A process for the separation of naphthalene from coke oven gas which comprises washing said gas at a temperature of substantially 35–40° C. with an effective amount of water, heated to substantially 33–38° C., in the upper zone of a tower; collecting the water thus enriched with naphthalene in a collector at the bottom of said upper zone; running off said enriched water into a heating device to reheat it to substantially 43–48° C., and thence into a lower zone of said tower; forcibly introducing a solvent selected from the group consisting of anthracene oil and wash oil at a temperature of substantially 25–35° C. near the top of said lower zone, by means of an injector, and causing it to flow downwardly over a plurality of baffle plates disposed at the walls in said lower zone while leaving alternate passages therebetween; said baffle plates being disposed in a direction ranging from horizontal to slight downward inclination; said solvent and water contacting each other in countercurrent flow; said solvent, now enriched in naphthalene, being collected in a sump at the bottom of said lower zone, the inlet of said enriched water coming through the heating device being above said sump, an interface thus being formed; said sump being provided with a constant level device consisting essentially of a pipe extending substantially throughout the height of said lower zone and provided near its upper end with an overflow for removal of the naphthalene-enriched solvent.

9. A device for the separation of naphthalene from coke oven gas by a water wash followed by extraction with an organic solvent having higher density than water, which comprises a tower separated into an upper and a lower zone; inlet and outlet means for gas and for cooling and wash water in said upper zone; collecting means for naphthalene-enriched wash water on the bottom of said upper zone; heating means for gas and water to a predetermined temperature; run-off means for said enriched gas into the lower zone near the bottom thereof; inlet and injector means near the top of said lower zone for said solvent; a sump for said solvent substantially at the bottom of said lower zone, directly below the entry of said enriched water, water and solvent forming an interface; means for maintaining a constant level of said interface; a plurality of baffle plates fastened to the tower wall within said lower zone, leaving alternating narrow spaces therebetween, said plates being disposed in a direction ranging from horizontal to slight downward inclination; said water and solvent contacting each other in countercurrent flow and effecting an exchange of said naphthalene from said water to said solvent; outlet and recirculation means for the water now poor in naphthalene near the top of said lower zone and means for its recirculation into the upper zone; ventilating means near the top of said lower zone; and outlet means for the solvent now enriched with naphthalene from said sump and through said constant level means.

10. The device as defined in claim 9, wherein at least part of said baffle plates are perforated thus effecting the solvent flow in form of a spray.

11. The device as defined in claim 9, wherein the free ends of said baffle plates are provided with downwardly-protruding overflow weirs.

12. The device as defined in claim 9, wherein said constant level means is a pipe rising from the sump essentially throughout the height of said lower zone, provided with an overflow near its upper end for the withdrawal of enriched solvent.

13. The device as defined in claim 9, wherein said collecting means are connected to a cooling tower for excess water, and valve means therebetween regulating the return of the excess water.

14. The device as defined in claim 9, wherein said lower zone is divided vertically forming a narrow shaft on one side for preheating said enriched water entering therein from said upper zone through said run-off means; and heating means provided in said narrow shaft.

15. The device as defined in claim 14, wherein said shaft is provided with ventilating means separate from those for said lower zone.

References Cited

UNITED STATES PATENTS

| | | | |
|---|---|---|---|
| 2,810,450 | 10/1957 | Hartmann | 55—94 |
| 3,020,138 | 2/1962 | Wethly | 55—94 |

FOREIGN PATENTS

| | | |
|---|---|---|
| 333,297 | 8/1930 | Great Britain. |

REUBEN FRIEDMAN, Primary Examiner

C. N. HART, Assistant Examiner

U.S. Cl. X.R.

55—223; 261—3